United States Patent [19]
Brake et al.

[11] 3,902,526
[45] Sept. 2, 1975

[54] CONTROL VALVE FOR A FLUID PRESSURE SYSTEM

[75] Inventors: Cecil Clifford Brake; Peter Dragos, both of Raleigh, N.C.

[73] Assignee: Scovill Manufacturing Company, Waterbury, Conn.

[22] Filed: Feb. 11, 1974

[21] Appl. No.: 441,292

[52] U.S. Cl. ..... 137/625.64; 137/625.5; 137/625.66
[51] Int. Cl.² ........................................ F15B 13/043
[58] Field of Search....... 137/625.11, 625.27, 625.5, 137/625.64, 625.66; 251/26, 63.5

[56] References Cited
UNITED STATES PATENTS

| | | |
|---|---|---|
| 2,624,585 | 1/1953 | Churchill et al. ............ 137/625.64 X |
| 2,812,776 | 11/1957 | Lofftus et al. ................ 137/625.5 X |
| 3,283,784 | 11/1966 | Ruchser ........................ 137/625.64 |
| 3,307,586 | 3/1967 | Meyer ............................ 137/625.69 |
| 3,523,555 | 11/1970 | Padula .......................... 137/625.64 |
| 3,540,480 | 11/1970 | Leibfritz et al. ................ 137/625.6 |
| 3,559,686 | 2/1971 | Hoffman ....................... 137/625.64 |

Primary Examiner—Alan Cohan
Assistant Examiner—Gerald A. Michalsky
Attorney, Agent, or Firm—Dallett Hoopes

[57] ABSTRACT

This invention relates to a control poppet valve assembly wherein the outer poppets are precisely adjustable with respect to the spacing from the central poppet thus enabling the use of bevelled seating surfaces in a valve of this type. Such surfaces reduce the likelihood of foreign bodies disturbing the seating integrity of the valve. The invention also involves a system for actuating the valve either by a solenoid control or a manually-activated override control.

4 Claims, 11 Drawing Figures

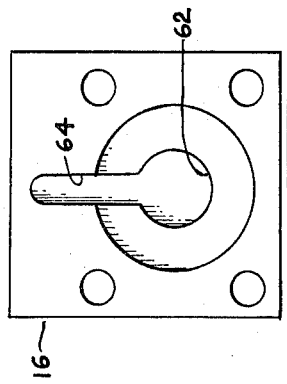
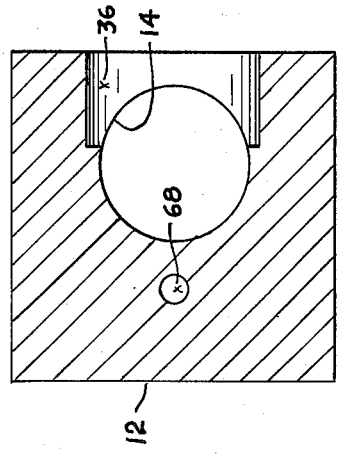
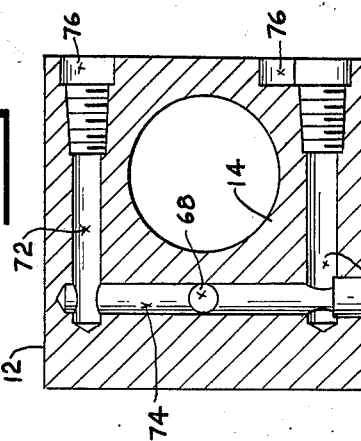
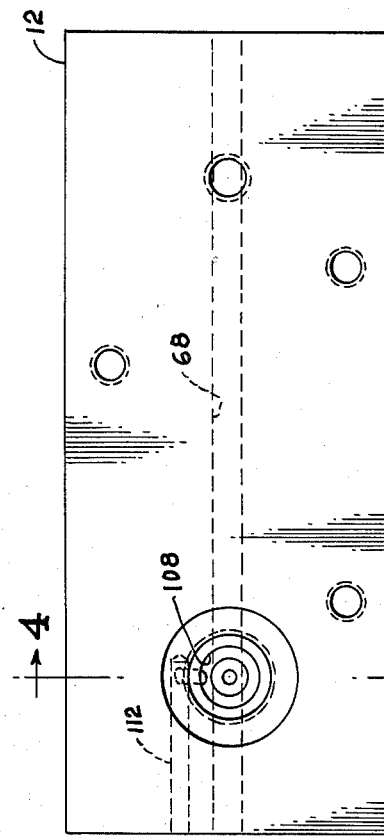
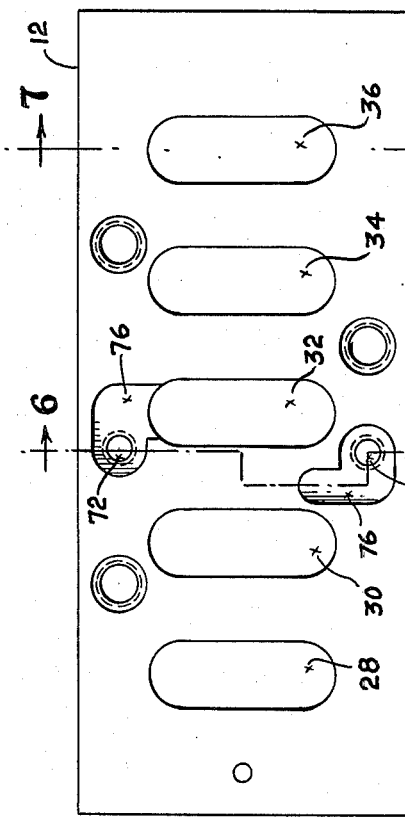
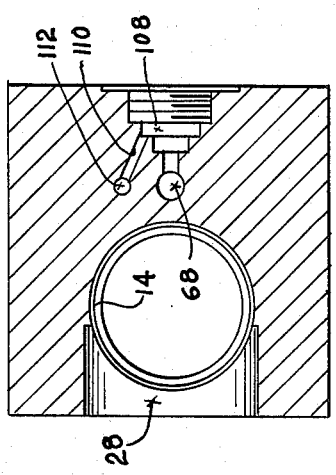
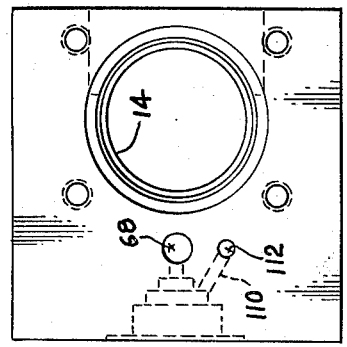

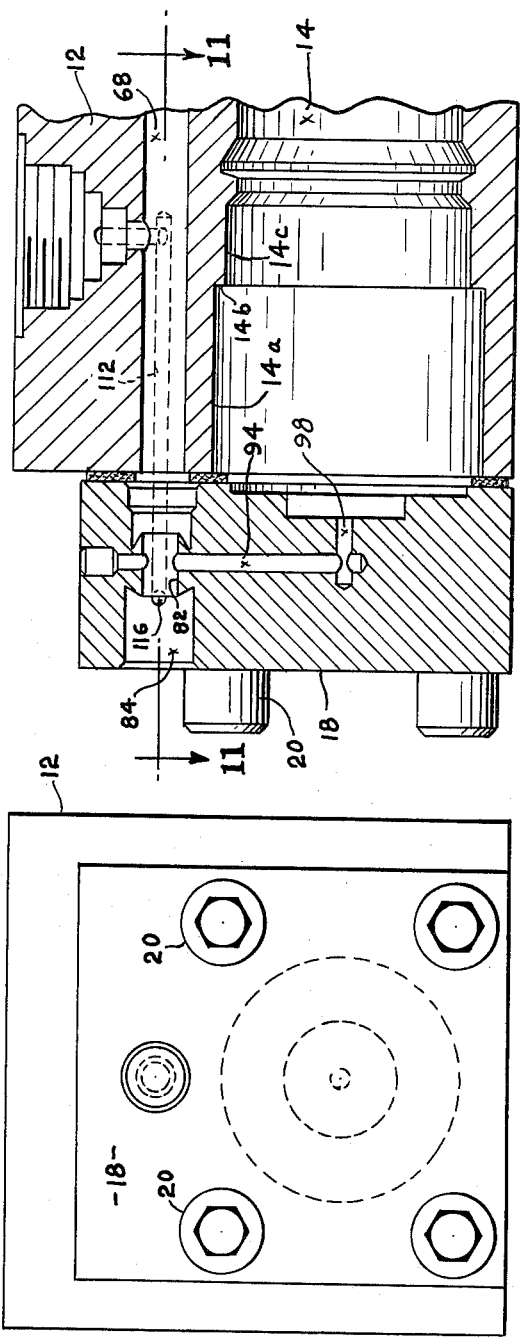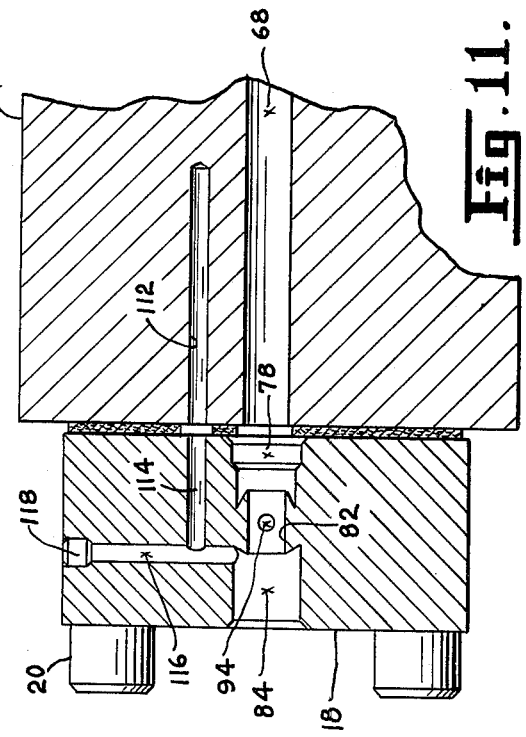

CONTROL VALVE FOR A FLUID PRESSURE SYSTEM

BACKGROUND OF THE INVENTION

1. Field of the Invention

The invention relates to a control valve for a fluid pressure system More specifically, in a preferred embodiment, the invention relates to a so-called four-way directional control poppet valve. The invention particularly relates to the provision in such a valve of bevelled seats for the poppets and in order that the valve may be used without appreciable leakage in an environment having dust or particle-laden air.

2. Description of the Prior Art

In the prior art there are disclosed a number of so-called four-way poppet valves which are often used for controlling a fluid-driven ram or piston cylinder-type fluid motor. Examples of such prior valves are well disclosed in the patent art and examples may be cited, for instance, the U.S. Pat. No. 3,089,517 granted May 14, 1963 to Ludwig, the U.S. Pat. No. 3,142,315 granted July 29, 1964 to Hennells, Sr., and U.S. Pat. No. 3,283,784 granted Nov. 8, 1966 to Ruchser.

Many of the prior art valves of the general type feature seating arrangements in which the valve seat is disposed in a radial plane and a flat valve element contacts the radial seat to valve off the flow. Trouble has been experienced in such prior seating arrangements in that dust or other particles in the fluid have often tended to settle on the radial seats, or radial valve elements, or flat valve element, and upon the closing of the valve thereafter have spoiled the integrity of the seating resulting in leakage which is very undesirable in such a valve. Such valves are used in automated operations, and, obviously, there is a great desire for trouble-free characteristics.

Bevelled seats are desirable in dirty environments. In bevelled seating arrangements, the seat is in effect a conical planar segment and the valve element itself has a diameter such that its peripheral edge fits the conical segment. This produces in effect a line contact between the valve element and the conical segment which line is, of course, a circle. Such a line contact markedly reduces the likelihood of foreign material winding up between the engaging surfaces as contrasted with the likelihood in a flat valve element hitting against a radial seat as in prior devices.

Bevelled seating has been shunned in the prior art primarily because of the difficulty in adjustment. In a four-way directional control poppet valve, for instance, two valves on a single shaft must be seated exactly while the two other valves are open. In the alternate position, the reverse is true: the first two valves are open while the second is exactly closed. Because the seats are not movable, the valves themselves must be exactly spaced.

It is an object of the present invention, therefore, to provide in a four-way directional control poppet valve, for instance, means for adjusting the valve elements on their single axial shaft so that the appropriate pairs of valve elements precisely seat exactly simultaneously on their respective bevelled seats. Means are provided to actuate the valve manually or by solenoid.

SUMMARY OF THE INVENTION

The invention, therefore, involves means for precisely controlling the distance between the outer poppets and the central poppet valve in such a four-way directional control poppet valve. The outer poppets are threaded to the axial shaft of the valve and piston spacers are respectively brought up snugly against the outer poppets from the outside ends thereof and locked into position by respective locking nuts secured at the outer ends of the shaft. In a preferred embodiment, the valve may be actuated either by a solenoid valve or by a manual override valve.

Other objects of the invention will be clear from the following specification and the accompanying drawings, all of which disclose a non-limiting embodiment of the invention. In the drawings:

FIG. 2 is a top plan view somewhat reduced of the central housing structure shown in FIG. 1 with the solenoid assembly removed;

FIG. 3 is a bottom plan view, somewhat reduced, showing the bottom plane only of the central housing shown in FIG. 1;

FIG. 4 is a sectional view taken on the line 4—4 of FIG. 2;

FIG. 5 is an end view of the adjacent end of the structure of FIG. 3;

FIG. 6 is a view along the line 6—6 of FIG. 3;

FIG. 7 is a view taken along the line 7—7 of FIG. 3;

FIG. 8 is a view of the inside of the right end cap, somewhat reduced, as shown in FIG. 1;

FIG. 9 is a fragmentary view similar to the left-hand end of FIG. 1 but with the solenoid assembly removed and the manual operator removed to show the flow of fluid through that portion of the housing;

FIG. 10 is an end view of the structure in FIG. 9; and

FIG. 11 is a sectional view taken on the line 11—11 of FIG. 9.

DESCRIPTION OF THE PREFERRED EMBODIMENT

Figure 1:
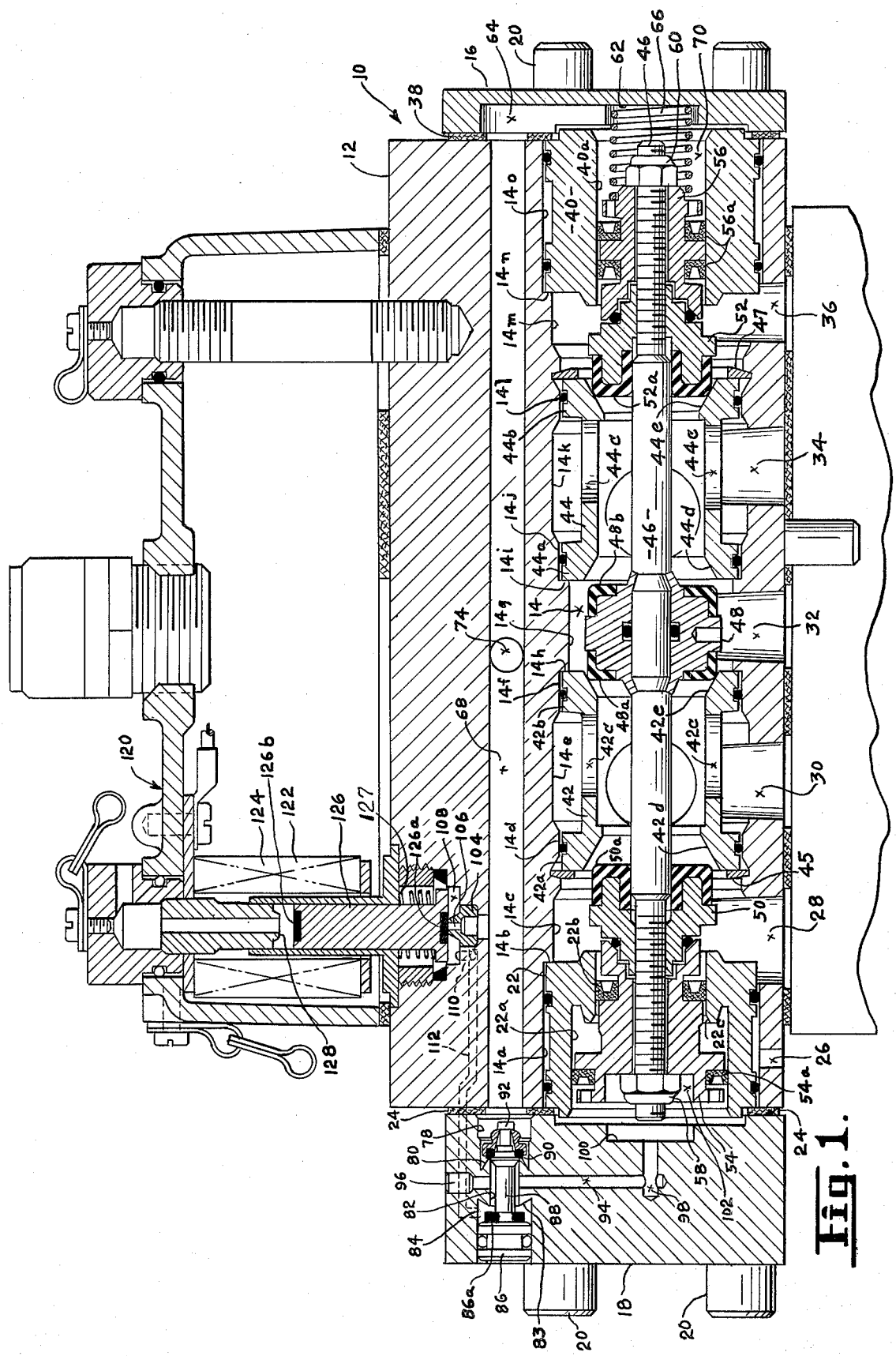
FIG. 1 is a sectional view taken along the axis of a four-way directional control poppet valve embodying the invention.

Referring more specifically to the drawings, a valve embodying the invention is generally designated 10 in FIG. 1. It comprises a housing 12. The housing is preferably a machined aluminum casting and features an enlarged opening 14 disposed longitudinally of the housing and provided with a number of spaced surfaces of various dimensions, as shown. As also shown, the opening 14 extends from one end of the housing to the other and is closed at the respective ends by the left end cap 18 and the right end cap 16, each of these caps being bolted to the housing by bolts 20 extending through appropriate openings in the end caps into tapped holes in the housing 12.

As will be seen, a number of annular elements are locked in place in the opening 14. Communicating with the left-hand end of the opening at a wide diameter 14a, a stationary piston adapter 22 is provided with spaced "O" rings and is sealed against diameter 14a thereby, its rightward end fitting against the shoulder 14b in the opening 14 and its left-hand end being held in position, as shown, by a gasket 24 clamped between the end cap 18 and the housing. The adapter 22 has an inward cylindrical surface 22a and its rightward end, as shown, has an inward flange terminating inwardly in a cylindrical surface 22b, the leftward end of which is provided with a bevel 22c for reasons which will appear. In the housing, a vent 26 vents the space between spaced seals on the outer periphery of the adapter 22. From the shoulder 14b proceeding rightwardly, the opening 14 presents a cylindrical land 14c and then an inwardly bevelled surface followed by a land 14d of reduced diameter. Thereafter, the opening 14 is bevelled outwardly to present a cylindrical land 14e of greater diameter from which is formed a lateral port 30 extending to the lower surface of the housing and adapted to be connected to an appropriate fitting. Rightwardly from the outer land, the surface of the opening 14 bevels inward and presents a reduced land 14f and a further inward step to central land 14g. Intermediate these two lands is a shoulder 14h. A laterally extending port 32 drops down from the central land portion 14g.

From the central shoulder in a rightward direction, the opening 14 has a profile which is the mirror image of the part thus far described. Thus, proceeding rightwardly, there is an outward radial shoulder 14i, a cylindrical land 14j from which there extends an outwardly tapered surface to an outward cylindrical land 14k. An additional lateral port 34 extends downwardly from the area of the land 14k. A bevelled connecting surface from the right side of the land 14k terminates in a land 14l of reduced diameter from which a bevel leads to an outer land 14m. From the area of land 14m a lateral port 36 drops. A radial shoulder 14n steps out to a final cylindrical land 14o which intersects the rightward face of the housing. A gasket 38 is disposed between the rightward end of the housing and the end cap 16 and serves to clamp a second piston adapter 40 in position between the gasket and the shoulder 14n. This second piston adapter 40 is provided with appropriate channels and spaced rings and sealingly engages the surface 14o. Its annular configuration offers a central opening 40a with a bevelled lead-in at its rightward end, as shown.

Secured in the openings 14e and 14k are two identical seat cages 42 and 44. These cages are annular and are provided with outward flanges at either end 42a and b, and 44a and b, respectively. The flanges are at their outward periphery formed with seals and sealingly fit against the lands 14d and 14f and 14j and 14i, respectively. The inner ends of the cages butt against the shoulders 14h and 14i, respectively, and locking rings 45 and 47 fit into appropriate grooves in the lands 14d and 14l, respectively, to hold the cages firmly against their respective shoulders. The cages have radial openings as at 42c and 44c to permit the central portion of the valve to communicate with ports 30 and 34.

The cages 42 and 44 present the outer bevelled seats 42d and 44e and the inner bevelled seats 42e and 44d.

Operably disposed inside the opening 14 is the valve assembly. It comprises a shaft 46 having a central poppet 48 which is rigidly fixed thereto. The poppet 48 is provided with rubber-covered valve edge elements 48a and 48b. The opposite ends of the shaft 46 are threaded, as shown. Outer poppet elements 50 and 52 are provided and include rubber-covered valve elements 50a and 52a. The outer poppets are threadedly received on the threaded portions of the shaft 46 respectively.

Outward from the outer valve elements 50 and 52 respectively, are piston-spacer units 54 and 56. These units each have central bore which amply pass the threaded portions of the shaft 46 respectively, and the piston-spacer unit 54 is formed with an outer flange having a peripheral groove containing a seal 54a engaging the surface 22a of the adapter 22. At the other end of the shaft, the piston-spacer unit 56 also carries grooves having sealing means 56a sealingly engaging the inner surface 40a of the adapter 40. Lock nuts 58 and 60 engage the outer end of the respective spacer-piston units.

The outer ends of the outer poppets 50, 52 are stepped, as shown. These outer ends are engaged respectively by recesses in the mating ends of the spacer-piston units 54 and 56.

As shown in FIGS. 1 and 8, the rightward end cap 16 of the valve is provided with a circular recess 62 and an outer channel 64. In assembly, an axial spring 66 is disposed between the end of the spacer-piston 56 and the recess 62 to bias the valve shaft assembly leftward.

Attention is now drawn to the upper portion of the housing which includes a longitudinally disposed channel 68. This channel, at it rightward end, is aligned with the channel 64 in the end cap 16 to communicate its fluid to the piston chamber 70 defined by the surface 40a of the adapter 40 and disposed between the outer end of the spacer-piston unit 56 and the end cap. From outward on either side of the central port 32 (FIG. 3), passages 72 extend up to a cross passage 74 (FIG. 6) communicating with the longitudinal passage 68. By means of a shallow channel 76, fluid in port 32 communicates to the passage 72.

In the left end cap 18 (FIG. 1), an override valve assembly is aligned with the channel 68. The assembly comprises a chamber 78 having an inwardly directed annular seat 80 and a continuing bore 82 with an enlargement 84, the bore 82, adjacent the enlargement defining an override exhaust seat 83. The pilot valve includes an operating button 86 sealingly disposed in the enlargement 84, a stem 88, and a valve element 90. The button 86 carries on its inside face a seal 86a adapted to seat on override exhaust seat 83. As shown, the valve element 90 is annular and normally seats on seat 80. The element 90 is secured on the stem 88 against the shoulder thereon and held in place by a separate locking ring which butts against stem head 92. The spacing between seals 80 and 83 is less than the spacing between 90 and 86a so that the seats must be closed alternately and cannot be contemporaneously closed.

From the continuing bore 82, a passage 94 which is plugged at its outer end at 96, communicates with an axial passage 98 to a recess 100 in the end cap 18. This recess is aligned with a piston chamber 102 defined by the surface 22a, the recess 100, and the spacer-piston unit 54.

Attention is now directed to the electrical operating facility of the valve. From the passage 68, an upwardly extending opening terminates in the inserted solenoid seat 104 having an opening 106. The seat 104 is surrounded by a circular recess 108 from which a passage 110 extends downward to a cross passage 112 (FIG. 4) disposed longitudinally of the housing. The leftward terminus of the passage 112 is aligned with a passage 114 (FIG. 9) which in turn is connected with a cross passage 116 whose outward end is plugged as at 118 and which intersects the enlargement 84 of the pilot valve assembly.

Secured on the top of the housing 12 is a solenoid assembly 120 which includes a solenoid 122 having a magnetic winding 124 and a valve element-armature 126 hexagonal in cross-section and normally held downward by spring 127 with seal 126a against seat 104 to close off opening 106. In this downward position, the seal 126b at the upper end of the armature is spaced from exhaust seat 128, and the opening of which vents to atmosphere.

The structure having now been described, its operation will be readily apparent. When connected in a conventional manner to the various ports of the device which the control poppet valve is to operate, it will be seen that the supply pressure which is normally connected to port 32 enters through the opening provided between the poppet 48 and the surface 44d in FIG. 1. The supply pressure is also communicated to the shallow channel 76, to passage 72, intersecting passage 74, and the axial passage 68 (see FIGS. 3 and 7). Thus, the same pressure is present in the channel 64 and the piston chamber 70. In manual operation by the override valve assembly, the button 86 may be pressed to seat the override exhaust seal 86a on the override exhaust seat 83 and to unseat the valve 90 permitting the pressure in passage 68 to communicate past the seat 80 through the stem passage 82, the intersecting passage 94, passage 98, and into chamber 102. Because the diameter of the spacer-piston unit 54 is greater than the diameter of the spacer-piston unit 56, the valve assembly in its entirety is driven rightwardly from the first position shown to a second position in which the element 48b seats against the surface 44d and the pressure in port 32 communicates between surface 42e and the element 48a.

Upon the release of the button 86, the valve 90 will seat on seat 80 cutting off the pressure to chamber 102 which pressure will bleed out through seat 83, through passages 116, 114, 112 into the solenoid chamber around hexagonal armature 126 and out through exhaust seat 128. After this bleeding, the air pressure in chamber 70 and the spring 66 will return the valve to the first position, as shown. The spring 66 is provided to assure return of the valve to the first position in case of air pressure failure.

For electrical operation, the solenoid passage bypasses the override valve assembly 90–86. Thus, pressure in channel 68 communicates through the solenoid opening 106 when the armature is raised. With the armature raised, the exhaust seal 126b closes off the exhaust seat 128. Fluid pressure then communicates into recess 108, through passage 110 and connecting passage 112, into a line passage 114 intersecting passage 116 (FIG. 11) and enlargement 84 (FIG. 1) which communicates through the stem passage 82 to passages 94 and 98 to the chamber 102. When the solenoid is deactivated and the solenoid valve is closed by spring 127, the chamber 102 will thereafter bleed out as heretofore described through chamber 82, passages 116, 112, recess 108, and seat 128 to vent, returning the control valve to the first position, as shown.

The arrangement of the poppet valves is as generally well-known in the art. Thus, when the valve is in, the first position, supply communicates from port 32 through the passage between the valve element 48b and surface 44d through the openings 44c to the port 34. Simultaneously, any chamber connected to the port 30 has its fluid communicate through the openings 42c and through the space between the valve element 50a and surface 42d to the port 28. Usually, this is an exhaust operation where the chamber connected to port 30 is exhausted to atmosphere.

When the valve is in the second position, that is, the valve assembly is in its rightward position and the valve 48b engages the surface 44d, the supply connected to port 32 passes between the valve element 48a and the surface 42e, through the openings 42c in the cage 42 and to port 30. It will be noted that the exhaust passage between valve 50a and surface 42d is at this time closed. On the other side of the valve, in this second position, the chamber connected to port 34 communicates through the opening 44c and through the space between valve element 52a and surface 44e which is then open. This latter arrangement usually provides for the exhaust of the chamber on the operated device connected to the port 34.

An essential feature of the invention is the means for adjusting the spacing between the valve poppets, as described. The poppet 48 is fixedly mounted on the shaft 46. It is essential, therefore, that the outer valves be in exact position with respect thereto. Under the present invention, this is achieved by placing the valve, for instance, in the first position as shown with the poppet 48 engaging the surface 42e. At this point, the outer poppet 52 is screwed inward until its surface 52a just seats on the surface 44e. At this precise point, the spacer-piston unit 56 is fitted into place and the nut 60 drawn up tight. This sets the valve 52 precisely so that when surface 48a on poppet 48 contacts surface 42e, surface 52a on poppet 52 contacts surface 44e.

By the same token, in setting the position of the outer valve 50, the valve assembly is moved to its second position with the valve element 48b contacting the surface 44d. At this point, the valve 50 is threaded onto the threaded end of shaft 46 to the point at which the valve element 50a just contacts the bevelled surface 42d, closing it off. At this point, the spacer-piston unit 54 is pushed onto the threaded shaft 46 and the nut 58 is snugly tightened thereagainst.

By means of the arrangement of parts described, it is possible to precisely set the position of the control poppet valve as described. This makes possible the use of bevelled valve seating surfaces which greatly reduces the possibility of foreign particles breaking the integrity of valve seating and makes possible a valve which is readily usable in a so-called hostile environment wherein the air contains particles of dust, dirt, etc.

It should be understood that the control valve disclosed herein may be used as a pressure selector valve wherein the port 32 may function as the outlet while the ports 30 and 34 may be connected to pressure sources of differing values. The pressure supplied to the outlet in such an arrangement will depend on the position of the valve assembly. As disclosed in the art, the working surfaces of the control pistons 54 and 56 should be of suffficient size so that the force of the control pressure can dominate the force of the inlet pressures against the radial poppet surfaces working against the control pressure force.

The invention having been described in one embodiment, it is to be understood that it is not so limited but is capable of many variations, all of which are described in the following claim language:

I claim:

1. In a control valve for a fluid pressure system comprising a housing, an axial bore in the housing, a plurality of ports extending radially into the housing including a central inlet port, a pair of outlet ports on opposite sides of the inlet port respectively, a pair of exhaust ports on the outside of said outlet ports with respect to the inlet port respectively, a pair of annular seat cages disposed axially of the bore and locked in position in the housing on the opposite sides respectively of the inlet port, each of the seat cages having passages through the wall thereof permitting passage to the outlet ports respectively, each of the seat cages having bevelled seats in the opposite ends thereof respectively, the bore having cylinder means concentric therewith of differing diameters at the opposite ends thereof respectively, and a poppet valve assemmbly comprising a shaft disposed axially of the bore and having a central poppet rigidly secured thereon and having circular working edges on the opposite ends thereof, the edges adapted to alternately engage the bevelled seats of the cages on opposite sides of the inlet port when the assembly is in first or second position, outer poppets disposed on opposite ends of the shaft beyond the cages respectively and having circular working edges adapted to engage and be spaced from alternately the respective outer seats on the seat cages when the assembly is in the first and second positions and piston-spacer units on the assembly outward of the outer poppets respectively and cooperative with the cylinder means respectively, and means in the valve for connecting fluid pressure to the smaller of the two cylinder means and selectively to the larger of the two cylinder means to selectively drive the assembly from the first to the second position, the improvement of the ends of the shaft being threaded and the outer poppets having central bores and being interiorly threaded and threadedly received respectively onto the threaded ends of the shaft, the piston-spacer units each having a central bore receiving the threaded zone and a pair of lock nuts respectively threadedly engaging the threads on the respective ends of the shaft to hold the piston-spacer units on the shaft and whereby the positions of the outer poppets respectively can be adjusted by screwing the poppet on the shaft and when the assembly is at the first or second position as appropriate until the circular edge seats on the respective outer seat and tightening the lock nut to effect the locking of the said outer poppet in position.

2. A control valve as claimed in claim 1 wherein the circular edges of each of the poppets are of resilient sealing material.

3. A control valve as claimed in claim 1 wherein the central poppet has outward annular flanges which tightly engage about the shaft to rigidly secure it in position on the shaft.

4. A control valve as claimed in claim 1 wherein the means in the valve for connecting fluid pressure selectively to the larger of the two cylinder means comprises:
  a. a solenoid-operated valve having an operating chamber with a normally closed inlet adapted to be connected to a constant source of fluid pressure, the solenoid inlet being opened when the solenoid-operated valve is actuated, and a normally open exhaust vented to atmosphere, the solenoid exhaust being closed when the solenoid is activated;
  b. a manually-operated override valve having a central chamber with a first and a second annular outwardly facing seat on the opposite sides thereof respectively, a manual actuator extending through the central chamber and the seats and having a first and a second seal thereon adapted to cooperate selectively with the first and second seats respectively, the actuator normally being in a first position whereat the first seal closes off the first seat with the second seat open, but movable to a second position whereat the second seal closes off the second seat with the first seat open, closed first and second end chambers in the override valve respectively disposed contiguous to the first and second seats, the first end chamber being connected to the constant source of fluid pressure;
  c. first fluid passage means connecting the central chamber of the override valve and the larger of the two cylinder means; and
  d. second fluid passage means connecting the second end chamber of the override valve and the solenoid operating chamber, whereby the solenoid-operated valve when actuated delivers fluid under pressure to the larger cylinder through the central chamber of the override valve and the second end chamber of the override valve and when subsequently de-energized permits exhaust from the larger cylinder means via the same route; and whereby when the solenoid-actuated valve is deactivated, the manually-operated override valve may be moved to the second position, closing off said second fluid passage means and delivering fluid under pressure to the larger cylinder via the central chamber and the first fluid passage means and when subsequently the manually-operated override is moved to the first position and the first seat is closed, the second seat is opened permitting exhaust flow from the larger cylinder via the said same route.

* * * * *

UNITED STATES PATENT OFFICE
CERTIFICATE OF CORRECTION

Patent No. 3,902,526                    Dated September 2, 1975

Inventor(s) Cecil Clifford Brake et al.          Page 1 of 3

It is certified that error appears in the above-identified patent and that said Letters Patent are hereby corrected as shown below:

Column 5, 6, 7 and 8 as shown on the attached sheets should be included, but will apply exclusively to the grant only.

Signed and Sealed this ninth Day of March 1976

[SEAL]

Attest:

RUTH C. MASON
Attesting Officer

C. MARSHALL DANN
Commissioner of Patents and Trademarks 126 hexagonal in cross-section and normally held downward by spring 127 with seal 126a against seat 104 to close off opening 106. In this downward position, the seal 126b at the upper end of the armature is spaced from exhaust seat 128, and the opening of which vents to atmosphere.

The structure having now been described, its operation will be readily apparent. When connected in a conventional manner to the various ports of the device which the control poppet valve is to operate, it will be seen that the supply pressure which is normally connected to port 32 enters through the opening provided between the poppet 48 and the surface 44d in FIG. 1. The supply pressure is also communicated to the shallow channel 76, to passage 72, intersecting passage 74, and the axial passage 68 (see FIGS. 3 and 7). Thus, the same pressure is present in the channel 64 and the piston chamber 70. In manual operation by the override valve assembly, the button 86 may be pressed to seat the override exhaust seal 86a on the override exhaust seat 83 and to unseat the valve 90 permitting the pressure in passage 68 to communicate past the seat 80 through the stem passage 82, the intersecting passage 94, passage 98, and into chamber 102. Because the diameter of the spacer-piston unit 54 is greater than the diameter of the spacer-piston unit 56, the valve assembly in its entirety is driven rightwardly from the first position shown to a second position in which the element 48b seats against the surface 44d and the pressure in port 32 communicates between surface 42e and the element 48a.

Upon the release of the button 86, the valve 90 will seat on seat 80 cutting off the pressure to chamber 102 which pressure will bleed out through seat 83, through passages 116, 114, 112 into the solenoid chamber around hexagonal armature 126 and out through exhaust seat 128. After this bleeding, the air pressure in chamber 70 and the spring 66 will return the valve to the first position, as shown. The spring 66 is provided to assure return of the valve to the first position in case of air pressure failure.

For electrical operation, the solenoid passage bypasses the override valve assembly 90-86. Thus, pressure in channel 68 communicates through the solenoid opening 106 when the armature is raised. With the armature raised, the exhaust seal 126b closes off the exhaust seat 128. Fluid pressure then communicates into recess 108, through passage 110 and connecting passage 112, into a line passage 114 intersecting passage 116 (FIG. 11) and enlargement 84 (FIG. 1) which communicates through the stem passage 82 to passages 94 and 98 to the chamber 102. When the solenoid is deactivated and the solenoid valve is closed by spring 127, the chamber 102 will thereafter bleed out as heretofore described through chamber 82, passages 116, 112, recess 108, and seat 128 to vent, returning the control valve to the first position, as shown.

The arrangement of the poppet valves is as generally well-known in the art. Thus, when the valve is in the first position, supply communicates from port 32 through the passage between the valve element 48b and surface 44d through the openings 44c to the port 34. Simultaneously, any chamber connected to the port 30 has its fluid communicate through the openings 42c and through the space between the valve element 50a and surface 42d to the port 28. Usually, this is an exhaust operation where the chamber connected to port 30 is exhausted to atmosphere.

When the valve is in the second position, that is, the valve assembly is in its rightward position and the valve 48b engages the surface 44d, the supply connected to port 32 passes between the valve element 48a and the surface 42e, through the openings 42c in the cage 42 and to port 30. It will be noted that the exhaust passage between valve 50a and surface 42d is at this time closed. On the other side of the valve, in this second position, the chamber connected to port 34 communicates through the opening 44c and through the space between valve element 52a and surface 44e which is then open. This latter arrangement usually provides for the exhaust of the chamber on the operated device connected to the port 34.

An essential feature of the invention is the means for adjusting the spacing between the valve poppets, as described. The poppet 48 is fixedly mounted on the shaft 46. It is essential, therefore, that the outer valves be in exact position with respect thereto. Under the present invention, this is achieved by placing the valve, for instance, in the first position as shown with the poppet 48 engaging the surface 42e. At this point, the outer poppet 52 is screwed inward until its surface 52a just seats on the surface 44e. At this precise point, the spacer-piston unit 56 is fitted into place and the nut 60 drawn up tight. This sets the valve 52 precisely so that when surface 48a on poppet 48 contacts surface 42e, surface 52a on poppet 52 contacts surface 44e.

By the same token, in setting the position of the outer valve 50, the valve assembly is moved to its second position with the valve element 48b contacting the surface 44d. At this point, the valve 50 is threaded onto the threaded end of shaft 46 to the point at which the valve element 50a just contacts the bevelled surface 42d, closing it off. At this point, the spacer-piston unit 54 is pushed onto the threaded shaft 46 and the nut 58 is snugly tightened thereagainst.

By means of the arrangement of parts described, it is possible to precisely set the position of the control poppet valve as described. This makes possible the use of bevelled valve seating surfaces which greatly reduces the possibility of foreign particles breaking the integrity of valve seating and makes possible a valve which is readily usable in a so-called hostile environment wherein the air contains particles of dust, dirt, etc.

It should be understood that the control valve disclosed herein may be used as a pressure selector valve wherein the port 32 may function as the outlet while the ports 30 and 34 may be connected to pressure sources of differing values. The pressure supplied to the outlet in such an arrangement will depend on the position of the valve assembly. As disclosed in the art, the working surfaces of the control pistons 54 and 56 should be of suffficient size so that the force of the control pressure can dominate the force of the inlet pressures against the radial poppet surfaces working against the control pressure force.

The invention having been described in one embodiment, it is to be understood that it is not so limited but is capable of many variations, all of which are described in the following claim language:

I claim:
1. In a control valve for a fluid pressure system comprising a housing, an axial bore in the housing, a plurality of ports extending radially into the housing includ- ing a central inlet port, a pair of outlet ports on opposite sides of the inlet port respectively, a pair of exhaust ports on the outside of said outlet ports with respect to the inlet port respectively, a pair of annular seat cages disposed axially of the bore and locked in position in the housing on the opposite sides respectively of the inlet port, each of the seat cages having passages through the wall thereof permitting passage to the outlet ports respectively, each of the seat cages having bevelled seats in the opposite ends thereof respectively, the bore having cylinder means concentric therewith of differing diameters at the opposite ends thereof respectively, and a poppet valve assemmbly comprising a shaft disposed axially of the bore and having a central poppet rigidly secured thereon and having circular working edges on the opposite ends thereof, the edges adapted to alternately engage the bevelled seats of the cages on opposite sides of the inlet port when the assembly is in first or second position, outer poppets disposed on opposite ends of the shaft beyond the cages respectively and having circular working edges adapted to engage and be spaced from alternately the respective outer seats on the seat cages when the assembly is in the first and second positions and piston-spacer units on the assembly outward of the outer poppets respectively and cooperative with the cylinder means respectively, and means in the valve for connecting fluid pressure to the smaller of the two cylinder means and selectively to the larger of the two cylinder means to selectively drive the assembly from the first to the second position, the improvement of the ends of the shaft being threaded and the outer poppets having central bores and being interiorly threaded and threadedly received respectively onto the threaded ends of the shaft, the piston-spacer units each having a central bore receiving the threaded zone and a pair of lock nuts respectively threadedly engaging the threads on the respective ends of the shaft to hold the piston-spacer units on the shaft and whereby the positions of the outer poppets respectively can be adjusted by screwing the poppet on the shaft and when the assembly is at the first or second position as appropriate until the circular edge seats on the respective outer seat and tightening the lock nut to effect the locking of the said outer poppet in position.

2. A control valve as claimed in claim 1 wherein the circular edges of each of the poppets are of resilient sealing material.

3. A control valve as claimed in claim 1 wherein the central poppet has outward annular flanges which tightly engage about the shaft to rigidly secure it in position on the shaft.

4. A control valve as claimed in claim 1 wherein the means in the valve for connecting fluid pressure selectively to the larger of the two cylinder means comprises:
 a. a solenoid-operated valve having an operating chamber with a normally closed inlet adapted to be connected to a constant source of fluid pressure, the solenoid inlet being opened when the solenoid-operated valve is actuated, and a normally open exhaust vented to atmosphere, the solenoid exhaust being closed when the solenoid is activated;
 b. a manually-operated override valve having a central chamber with a first and a second annular outwardly facing seat on the opposite sides thereof respectively, a manual actuator extending through the central chamber and the seats and having a first and a second seal thereon adapted to cooperate selectively with the first and second seats respectively, the actuator normally being in a first position whereat the first seal closes off the first seat with the second seat open, but movable to a second position whereat the second seal closes off the second seat with the first seat open, closed first and second end chambers in the override valve respectively disposed contiguous to the first and second seats, the first end chamber being connected to the constant source of fluid pressure;
 c. first fluid passage means connecting the central chamber of the override valve and the larger of the two cylinder means; and
 d. second fluid passage means connecting the second end chamber of the override valve and the solenoid operating chamber, whereby the solenoid-operated valve when actuated delivers fluid under pressure to the larger cylinder through the central chamber of the override valve and the second end chamber of the override valve and when subsequently de-energized permits exhaust from the larger cylinder means via the same route; and whereby when the solenoid-actuated valve is deactivated, the manually-operated override valve may be moved to the second position, closing off said second fluid passage means and delivering fluid under pressure to the larger cylinder via the central chamber and the first fluid passage means and when subsequently the manually-operated override is moved to the first position and the first seat is closed, the second seat is opened permitting exhaust flow from the larger cylinder via the said same route.

* * * * *